United States Patent
Lee et al.

(10) Patent No.: US 7,221,876 B2
(45) Date of Patent: *May 22, 2007

(54) METHOD OF OPTICALLY PRODUCING CLOCK AND APPARATUS THEREOF

(75) Inventors: Jaemyoung Lee, Seoul (KR); Jesoo Ko, Daejeon (KR)

(73) Assignee: Electronics and Telecommunications Research Institute (KR)

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 716 days.

(21) Appl. No.: 10/726,175

(22) Filed: Dec. 1, 2003

(65) Prior Publication Data

US 2004/0109639 A1 Jun. 10, 2004

(30) Foreign Application Priority Data

Dec. 2, 2002 (KR) ........................ 10-2002-0075880

(51) Int. Cl.
*H04B 10/00* (2006.01)
(52) U.S. Cl. ........................... 398/155; 398/154
(58) Field of Classification Search ........... 398/155, 398/154
See application file for complete search history.

(56) References Cited

U.S. PATENT DOCUMENTS

| 5,386,311 | A | 1/1995 | Shields | |
| 6,501,579 | B2 * | 12/2002 | Li et al. | 398/212 |
| 6,847,789 | B2 * | 1/2005 | Savoj | 398/155 |
| 6,963,436 | B2 * | 11/2005 | Watanabe et al. | 359/239 |

OTHER PUBLICATIONS

Bernd Franz "Optical Signal Processing. . . NRZ Clock Recovery"; Alcatel Corp. Research Center; copyright 2000 Optical Soc. of America (MG1-1-MG1-3).

* cited by examiner

*Primary Examiner*—M. R. Sedighian
(74) *Attorney, Agent, or Firm*—Blakely Sokoloff Taylor & Zafman

(57) ABSTRACT

Disclosed herein is a method of optically producing a clock, in which clock components are extracted from the spectrum of a transmitted optical signal and the influence of noise and jitter on the extracted clock components is reduced, thus improving the stability of an optical communication system. In the clock producing method of the present invention, a plurality of clock components are extracted by filtering out frequency bands between neighboring intensity peaks, and then a clock having reduced noise and jitter is produced by logically ANDing two or more of the plurality of clock components extracted at the step of extracting the plurality of clock components.

10 Claims, 5 Drawing Sheets

METHOD OF OPTICALLY PRODUCING CLOCK AND APPARATUS THEREOF

BACKGROUND OF THE INVENTION

1. Field of the Invention

The present invention relates generally to a method of optically producing a clock from an optical signal in an optical communication system, and more particularly to a method of optically producing a clock, in which clock components are extracted from the spectrum of a transmitted optical signal and the influence of noise and jitter on the extracted clock components is reduced, thus improving the stability of an optical communication system.

2. Description of the Related Art

In the field of optical communication, transmission speed has been rapidly increased. This increase of transmission speed requires the improvement of a transmitting end technology in which desired data are converted into optical signals and the improvement of a signal processing rate at which transmitted optical signals are received and restored to original data at a receiving end. A method of optically producing a clock is employed so as to recover original data at the receiving end of an optical communication system. Such a method of optically producing a clock may be exemplified by a method using the self-pulsation of a laser diode and a method using an optical loop mirror.

However, the conventional methods are disadvantageous in that devices for producing desired clocks are difficult to be fabricated and the stability of an optical communication system is deteriorated by noise and jitter.

SUMMARY OF THE INVENTION

An object of the present invention is to provide a method of optically producing a clock, which can be economically utilized by allowing its construction to be simplified and which can improve the stability of an optical system by reducing the noise and jitter of an extracted clock.

In order to accomplish the above object, the present invention provides a method of optically producing a clock from an optical signal having a plurality of intensity peaks at different frequencies on the spectrum of the optical signal, which includes the steps of extracting a plurality of clock components by filtering out frequency bands between neighboring intensity peaks; and producing a clock having reduced noise and jitter by logically ANDing two or more of the plurality of clock components extracted at the step of extracting the plurality of clock components.

The present invention also provides An apparatus of optically producing a clock from optical signal having three intensity peaks at different frequencies, which includes a first circulator having a first terminal, a second terminal and a third terminal, the first terminal receiving the optical signal, the second terminal sending the optical signal received by the first signal, and the third terminal sending a signal received by the second terminal; a first filter receiving the optical signal sent by the second terminal of the first circulator, extracting a first clock component which has frequency band between neighboring intensity peaks among the three intensity peaks, sending the first clock component to the second terminal of the first circulator, and outputting the remaining signal with the first clock component being extracted; a second circulator a first circulator having a first terminal, a second terminal and a third terminal, the first terminal receiving the remaining signal with the first clock component being extracted, a second terminal sending the remaining signal received by the first terminal, and the third terminal sending a signal received by the second terminal; a second filter receiving the remaining signal sent by the second terminal of the second circulator, extracting a second clock component which has frequency band between the other neighboring intensity peaks among the three intensity peaks, and sending the second clock component to the second terminal of the second circulator; and a logical AND unit producing a clock by logically ANDing the first clock component sent by the third terminal of the first circulator and the second clock component sent by the third terminal of the second circulator.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter a method of optically producing a clock in accordance with an embodiment of the present invention is described in detail with reference to accompanying drawings. In this embodiment, there is described a method of optically producing a clock using an optical signal transmitted at a transmission speed of 40 Gb/s.

Figure 1:
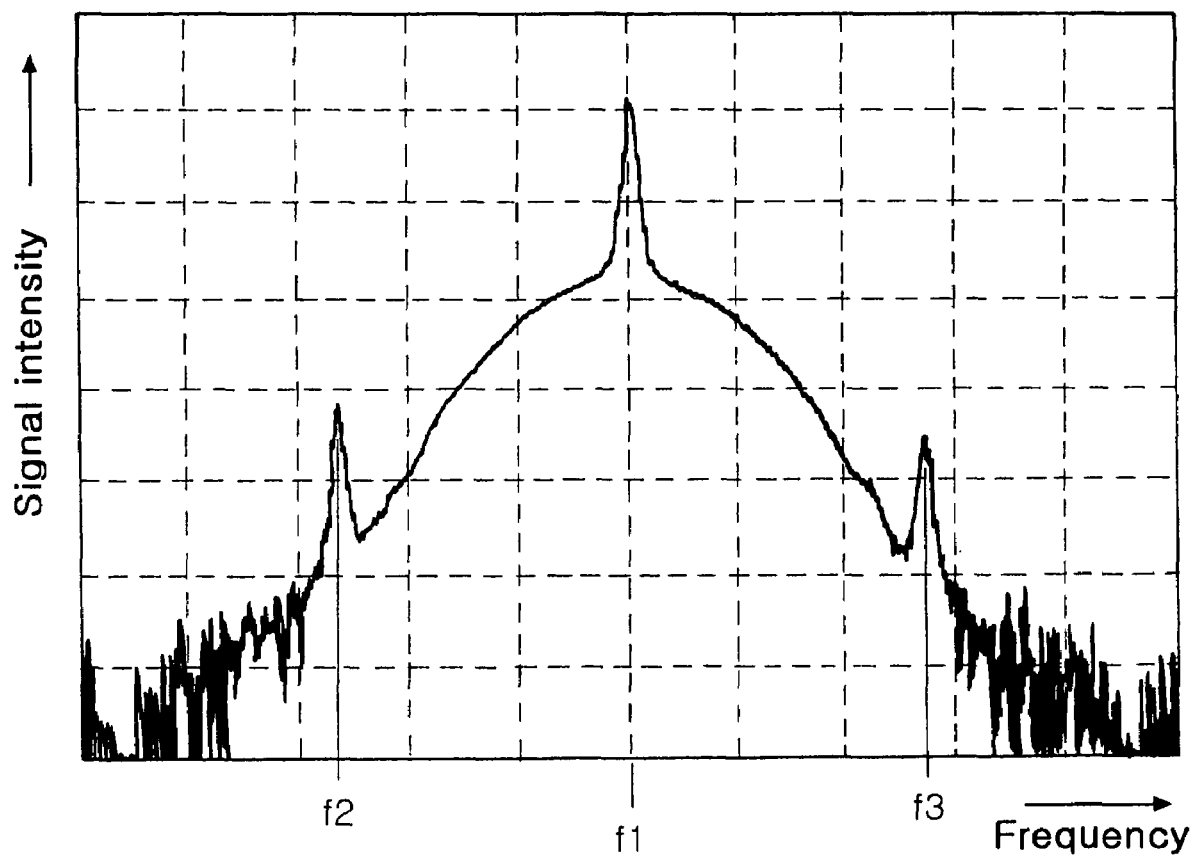
FIG. 1 is a graph showing the spectrum of an optical signal utilized for the present invention.

FIG. 1 is a graph showing the optical spectrum of a Non-Return-to-Zero (NRZ) signal transmitted at a transmission speed of 40 Gb/s. In the optical spectrum illustrated in FIG. 1, three intensity peaks are shown at three different frequencies f1, f2 and f3, and intervals between the frequencies of two neighboring intensity peaks, that is, two frequencies f1 and f2 and two frequencies f1 and f3, each are 40 GHz. In other words, the frequency interval between two neighboring intensity peaks, that is, 40 GHz, is a modulation speed of the transmitted optical signal. A clock can be extracted using the frequency interval so as to be used to demodulate the transmitted optical signal.

Figure 2:
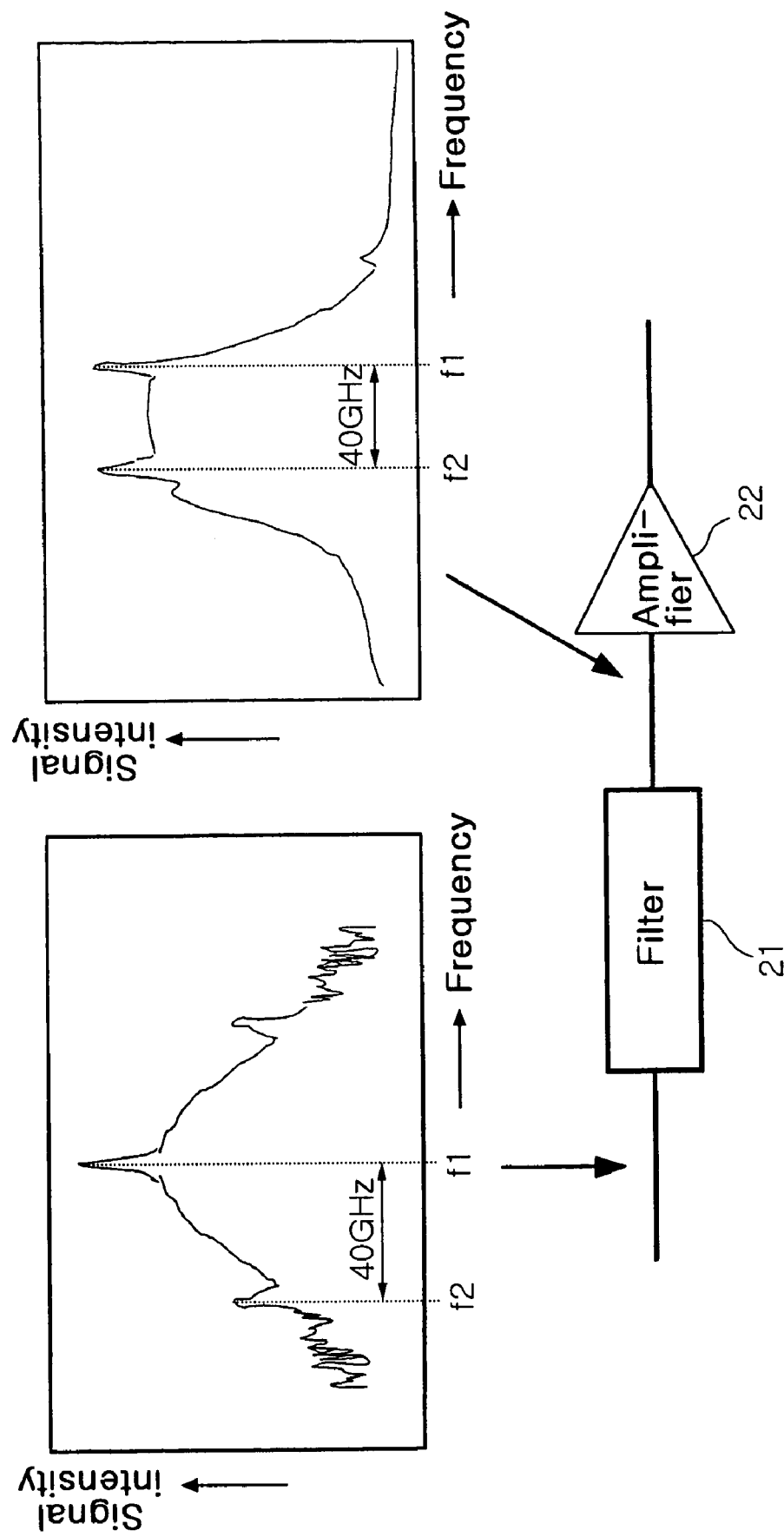
FIG. 2 is a diagram showing a process of extracting a clock component using the spectrum of an optical signal in accordance with an embodiment of the present invention.

FIG. 2 is a diagram showing a process of extracting a clock component using the optical spectrum of a NRZ signal transmitted at a transmission speed of 40 Gb/s. A clock component of 40 GHz is extracted by filtering out a frequency band between two neighboring intensity peaks in such a way as to pass the NRZ signal of 40 GHz having the optical spectrum illustrated in FIG. 1 through a filter 21. Since the clock extracted through the filter 21 is weak in terms of signal intensity, it is preferably amplified by an amplifier 22. In this embodiment, three intensity peaks are shown at different frequencies on the spectrum of the optical signal, so two clock components can be extracted when a clock is extracted by selecting frequency bands between neighboring intensity peaks. The method of extracting two clock components is described in detail with reference to FIG. 3.

Figure 3:
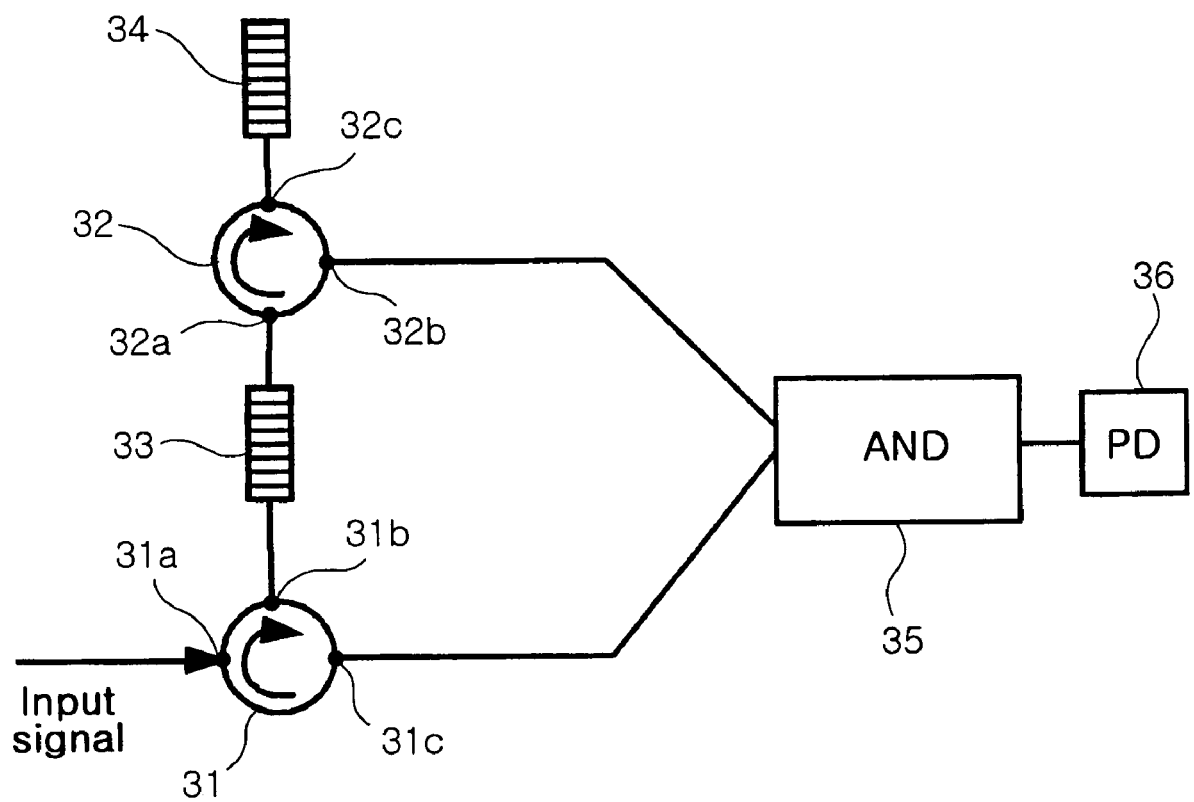
FIG. 3 is a diagram showing a process of extracting two clock components and a process of beating two clock components in accordance with an embodiment of the present invention.

FIG. 3 is a diagram showing an embodiment of apparatus for extracting two clock components and beating two clock components (for example, clock components which can be extracted from frequencies f1, f2 and f3 of FIG. 1). First, when the optical signal being used in the embodiment and having three intensity peaks at different frequencies is input through a first terminal 31a of a first circulator 31, the input signal is output through a second terminal 31b of the first circulator 31 as it is. By a first filter 33, frequency f2 and a part of optical power of frequency component f2 are extracted from the signal output to generate a clock component, and the clock component (hereinafter referred to as a "first clock component") extracted by the first filter 33 is input through the second terminal 31b of the first circulator 31 and output through a third terminal 31c of the first circulator 31. Meanwhile, the remaining signal with the first clock component being extracted is input through a first terminal 32a of a second circulator 32 and output through a second terminal 32b of the second circulator 32, and frequencies f3 and f1 of FIG. 1 are extracted as another clock component by a second filter 34. This clock component (hereinafter referred to as a "second clock component") extracted by the second filter 34 is input through the second terminal 32b of the second circulator 32 and output through a third terminal 32c of the second circulator 32. Since the first and second extracted clock components have significant noise and jitter as described above, the first and second clock components are input to a logical AND unit 35, logically ANDed and transmitted to a photodiode 36. The logical AND unit 35 is described in detail in conjunction with FIGS. 5A to 5C.

Figure 4A:
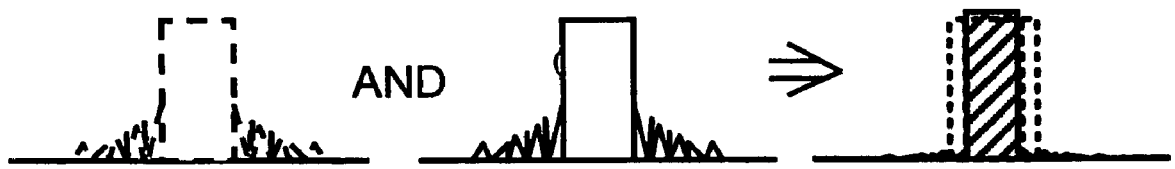
FIGS. 4A to 4D are views in each of which two clock components are logically ANDed together to form a clock in accordance with an embodiment of the present invention.
Figures 4B, 4C, 4D:
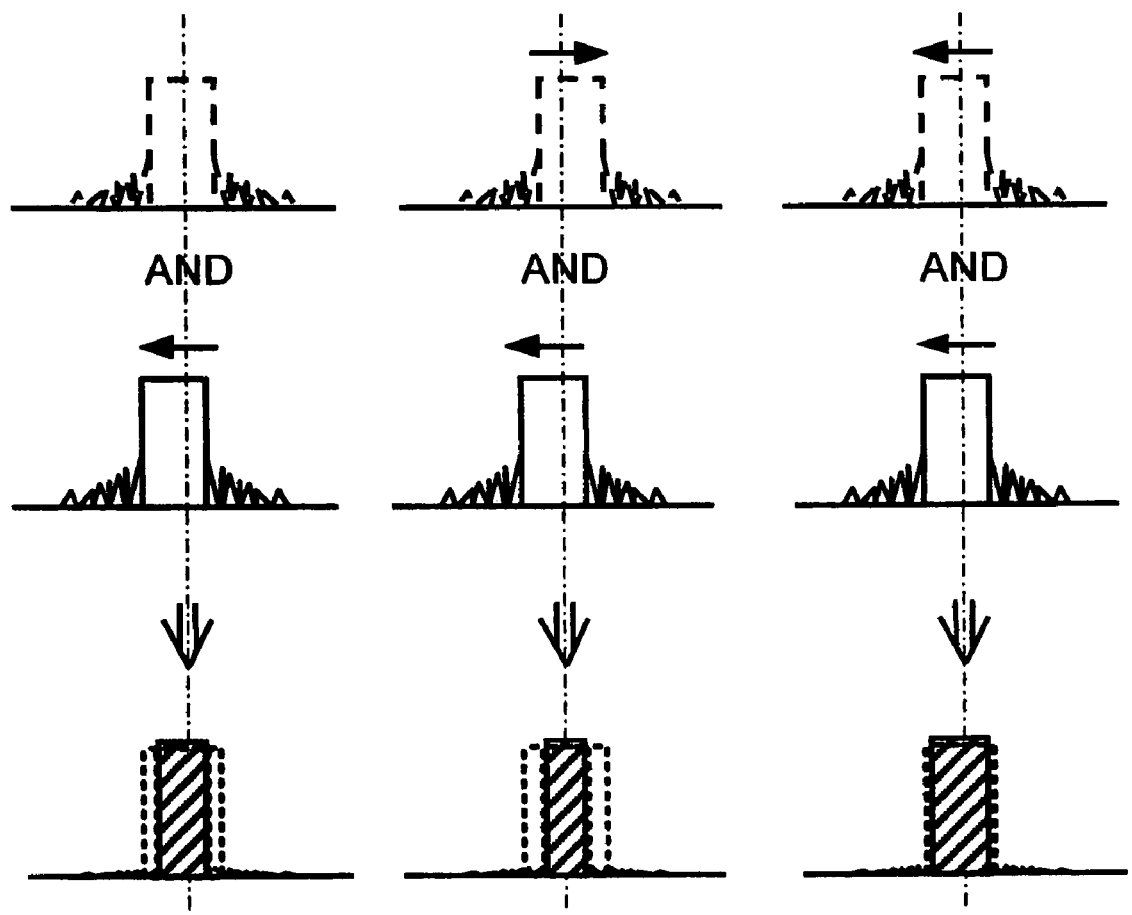

FIGS. 4A to 4D are views in which two clock components are logically ANDed together to form a clock. Referring to FIG. 4A, it can be appreciated that first and second clock components and include a considerable amount of jitter before a logical AND operation while a resulting clock includes a reduced amount of jitter after the logical AND operation. The reason for this is that overlapped region between the two signals in time domain remain after the logical AND operation. In the case where jitter exists in one of two clock components as shown in FIG. 4B, the influence of jitter can be reduced by logically ANDing one of the two clock components with the other. Additionally, in the case where two clock components move along a time axis in different directions as shown in FIG. 4C, jitter components existing in the two clock components cancel each other out through a logical AND operation. Furthermore, in the case where two clock components move along a time axis in the same direction as shown in FIG. 4D, when this case is compared to the other cases, a reduction in jitter is small. In contrast, when this case is compared to the case where the logical AND operation is not performed, it can be appreciated that jitter is comparatively significantly reduced.

Additionally, noise as well as jitter can be reduced through the logical ANDing of two clock components (not shown). Since random noise existing in each of the two clock components occurs independently of time, the influence of noise is reduced by the cancellation of two noise components when the two noise components occurring at two different times are logically ANDed with each other.

The method of optically logically ANDing two signals, that is, two clock components, with each other is described with reference to FIGS. 5A to 5C.

Figure 5A:
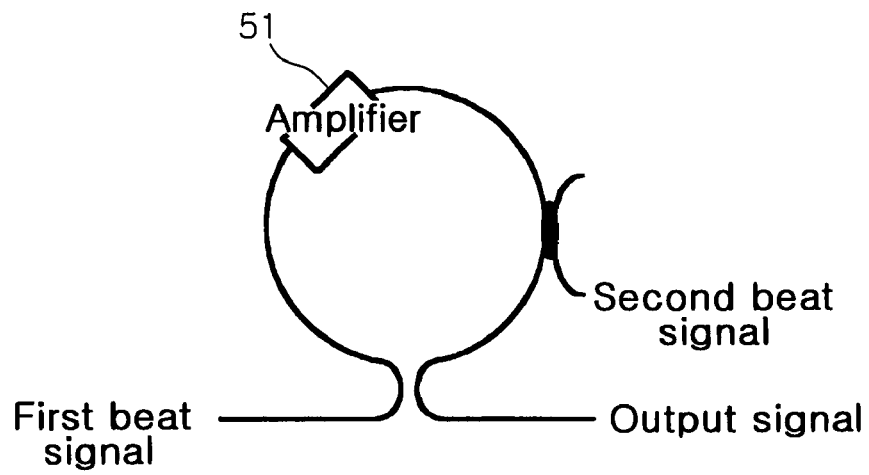
FIGS. 5A to 5C are diagrams showing constructions for implementing an optical, logical AND operation in accordance with an embodiment of the present invention.
Figure 5B:
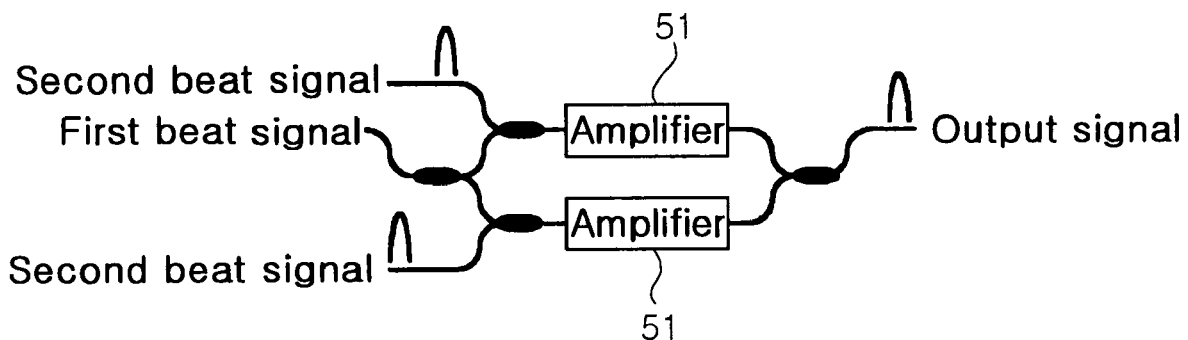
Figure 5C:
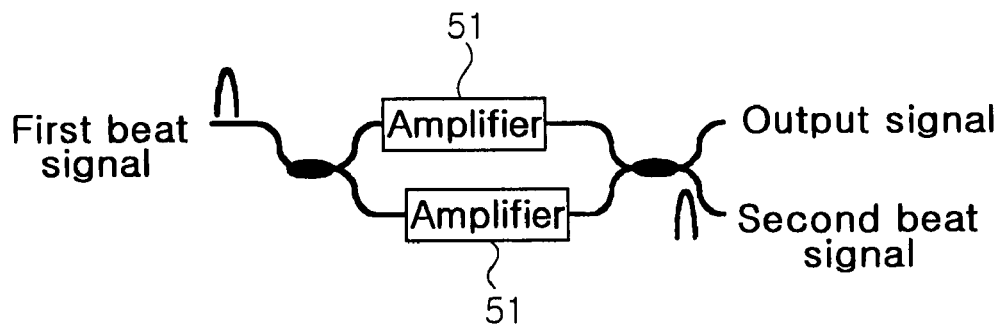

FIGS. 5A to 5C are diagrams showing constructions for implementing the optical, logical ANDing, each of which correspond to the logical AND unit 35 of FIG. 3. These constructions are examples that can implement the optical, logical ANDing. Since these constructions are not the inventive concept of the present invention itself, a detailed description of them is omitted here. FIG. 5A shows a construction for implementing the optical, logical ANDing using an optical loop mirror, in which a first beat signal becomes an input signal, and a second beat signal is wavelength converted, passed through a Semiconductor Optical Amplifier (SOA) 51 and used as a control signal to change the characteristics of the SOA. The second beat signal used as a control signal acts as a window that changes the size and optical path length of the other signal while passing through the SOA 51. The first beat signal, which is the input signal, is output only when the window exists, and exhibits an effect identical with that of the logical ANDing of two signals. FIG. 5B shows a construction for implementing the optical, logical ANDing using a symmetric Mach-Zehnder, which outputs a signal that is obtained by a logical AND operation on the basis of a principle identical with that of the method using the optical loop mirror shown in FIG. 5A. In this construction, one of two signals having been used as windows is required to be wavelength-converted. FIG. 5C is a construction for implementing the optical, logical ANDing using a colliding pulse Mach-Zehnder, in which a second beat signal, as shown in FIG. 5A, is used as a window for sending a first beat signal to an output terminal by changing the characteristics of a SOA 51 through the use of a second beat signal. Since in this construction the moving direction of the second beat signal is opposite to the moving direction of the first beat signal, it is not necessary to convert the wavelength of the second beat signal.

As described above, the method of optically producing a clock is advantageous in that the clock can be simply extracted by filtering the spectrum of a transmitted optical signal so as to restore an optical signal transmitted to the receiving end of an optical communication system. Additionally, the method of optically producing a clock according to the present invention is advantageous in that the stability of an optical communication system can be improved by reducing the influence of noise and jitter in such a way as to extract a plurality of clock components from a transmitted optical signal and logically-AND these clock components with each other.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of optically producing a clock from an optical signal having a plurality of intensity peaks at different frequencies on a spectrum of the optical signal, comprising the steps of:

extracting a plurality of clock components by filtering out frequency bands between neighboring intensity peaks; and producing a clock having reduced noise and jitter by logically ANDing two or more of the plurality of clock components extracted at the step of extracting the plurality of clock components.

2. The method of optically producing a clock as set forth in claim 1, wherein the logical ANDing performed at the step of extracting the clock is implemented through the use of an optical loop mirror.

3. The method of optically producing a clock as set forth in claim 1, wherein the logical ANDing performed at the step of extracting the clock is implemented through the use of a symmetric Mach-Zehnder.

4. The method of optically producing a clock as set forth in claim 1, wherein the logical ANDing performed at the step of extracting the clock is implemented through the use of a colliding Mach-Zehnder.

5. The method of optically producing a clock as set forth in claim 1, further comprising the steps of amplifying a plurality of the clock components.

6. An apparatus of optically producing a clock from optical signal having three intensity peaks at different frequencies, comprising:

a first circulator having a first terminal, a second terminal and a third terminal, the first terminal receiving the optical signal, the second terminal sending the optical signal received by the first signal, and the third terminal sending a signal received by the second terminal;

a first filter receiving the optical signal sent by the second terminal of the first circulator, extracting a first clock component which has frequency band between neighboring intensity peaks among the three intensity peaks, sending the first clock component to the second terminal of the first circulator, and outputting the remaining signal with the first clock component being extracted;

a second circulator having a first terminal, a second terminal and a third terminal, the first terminal receiving the remaining signal with the first clock component being extracted, a second terminal sending the remaining signal received by the first terminal, and the third terminal sending a signal received by the second terminal;

a second filter receiving the remaining signal sent by the second terminal of the second circulator, extracting a second clock component which has frequency band between the other neighboring intensity peaks among the three intensity peaks, and sending the second clock component to the third terminal of the second circulator; and a logical AND unit producing a clock by logically ANDing the first clock component sent by the third terminal of the first circulator and the second clock component sent by the third terminal of the second circulator.

7. The apparatus of optically producing a clock as set forth in claim 6, further comprising a photodiode to which the clock produced by the logic AND unit is transmitted.

8. The apparatus of optically producing a clock as set forth in claim 6, wherein the logical AND unit is an optical loop mirror.

9. The apparatus of optically producing a clock as set forth in claim 6, wherein the logical AND unit is a symmetric Mach-Zehnder.

10. The apparatus of optically producing a clock as set forth in claim 1, wherein the logical AND unit is a colliding Mach-Zehnder.

* * * * *